United States Patent
Schäfer et al.

(10) Patent No.: US 8,160,978 B2
(45) Date of Patent: Apr. 17, 2012

(54) METHOD FOR COMPUTER-AIDED CONTROL OR REGULATION OF A TECHNICAL SYSTEM

(75) Inventors: Anton Maximilian Schäfer, München (DE); Volkmar Sterzing, Neubiberg (DE); Steffen Udluft, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 556 days.

(21) Appl. No.: 12/386,639

(22) Filed: Apr. 21, 2009

(65) Prior Publication Data

US 2009/0271344 A1 Oct. 29, 2009

(30) Foreign Application Priority Data

Apr. 23, 2008 (DE) .................. 10 2008 020 379

(51) Int. Cl.
*G06E 1/00* (2006.01)
*G06E 3/00* (2006.01)
*G06F 15/18* (2006.01)
*G06G 7/00* (2006.01)
*G06N 3/00* (2006.01)

(52) U.S. Cl. ........................................ 706/30
(58) Field of Classification Search ............ 706/30
See application file for complete search history.

(56) References Cited

U.S. PATENT DOCUMENTS 5,857,321 A   1/1999   Rajamani et al.

FOREIGN PATENT DOCUMENTS

| DE | 102004011015 A1 | 9/2005 |
|----|-----------------|--------|
| DE | 102007001024 A1 | 7/2008 |
| DE | 102007001025 A1 | 7/2008 |
| EP | 936351 A2 | 8/1999 |
| WO | 0008599 A2 | 2/2000 |
| WO | WO 0055809 A2 | 9/2000 |
| WO | 0062250 A2 | 10/2000 |
| WO | WO 2005/081076 A2 | 9/2005 |

OTHER PUBLICATIONS

Rumelhart et al., "Learning internal representatins by error propagation", Parallel Distributed Processing: Exploration in the Microstructure of Cognition, 1986, pp. 318-362, vol. 1, Eds. Cambridge: MIT Press.
Kaelbling et el, Reinforcement Learning: A survey, Journal of Artificial Intelligence Research 4, 1996, pp. 237-285.

*Primary Examiner* — Jeffrey A Gaffin
*Assistant Examiner* — Benjamin Buss (57) ABSTRACT

A method for computer-aided control of any technical system is provided. The method includes two steps, the learning of the dynamic with historical data based on a recurrent neural network and a subsequent learning of an optimal regulation by coupling the recurrent neural network to a further neural network. The recurrent neural network has a hidden layer comprising a first and a second hidden state at a respective time point. The first hidden state is coupled to the second hidden state using a matrix to be learned. This allows a bottleneck structure to be created, in that the dimension of the first hidden state is smaller than the dimension of the second hidden state or vice versa. The autonomous dynamic is taken into account during the learning of the network, thereby improving the approximation capacity of the network. The technical system includes a gas turbine.

18 Claims, 2 Drawing Sheets

FIG 1

FIG 2

METHOD FOR COMPUTER-AIDED CONTROL OR REGULATION OF A TECHNICAL SYSTEM

CROSS REFERENCE TO RELATED APPLICATIONS

This application claims priority of German application No. 10 2008 020 379.3 filed Apr. 23, 2008, which is incorporated by reference herein in its entirety.

FIELD OF THE INVENTION

The invention relates to a method for computer-aided control and/or regulation of a technical system and a corresponding computer program product.

BACKGROUND OF THE INVENTION

When controlling complex technical systems it is often desirable to select the actions to be carried out on the technical system in such a manner that an advantageous desired dynamic behavior of the technical system is achieved. The dynamic behavior is however often not simple to predict in the case of complex technical systems, so corresponding computer-aided prediction methods are required, to estimate the future behavior of the technical system and to select appropriate actions for regulating or controlling the technical system correspondingly.

The control of technical systems today is frequently based on expert knowledge, in other words automatic regulation of the system is established on the basis of such expert knowledge. However approaches are also known, with which technical systems are controlled with the aid of known methods for what is known as reinforcement learning, see also document [2]. The known methods cannot however be applied generally to any technical systems and often do not furnish sufficiently good results.

A method for computer-aided control and/or regulation of a technical system is known from the German patent application DE 10 2007 001 025.9, in which an optimal action selection rule is learned in a computer-aided manner with the aid of neural networks. In this process the dynamic of the technical system is modeled with the aid of a recurrent neural network, which in turn is coupled to a further feed-forward network, which is used to learn the action selection rule.

SUMMARY OF THE INVENTION

The object of the invention is to create a method for computer-aided prediction of the dynamic behavior of a technical system, which can be applied generally to any technical systems and furnishes good results.

In the inventive method information about the dynamic behavior of the technical system is obtained respectively for a number of time points by means of a state of the technical system and of an action carried out on the technical system, with a respective action at a respective time point resulting in a new state of the technical system at the next time point. The technical system can be embodied in any manner here, so the states can be any measurable parameters of the technical system. Actions here can be actions in the actual sense, i.e. changes made to the technical system. However actions can also be represented by adjustable parameters or manipulated variables of the technical system, with the action representing the corresponding value of the manipulated variable or the parameter. An action can therefore also consist of a manipulated variable not being changed.

A state of the technical system is preferably characterized by a plurality of ambient and/or state variables, each state variable representing a specific measured quantity of the technical system. The state is therefore frequently a state vector. Similarly the action in some instances comprises a number of manipulated variables to be changed, each forming an input in a corresponding action vector.

In the inventive method the dynamic behavior of the technical system with a recurrent neural network is modeled in a first step with the aid of training data comprising known states and actions at a number of time points. The recurrent neural network here is formed by at least one input layer comprising the states of the technical system and the actions carried out on the technical system at the number of time points, at least one hidden recurrent layer comprising hidden states and at least one output layer comprising the states of the technical system at the number of time points. Recurrence in the neural network occurs here due to the development of the system over time, this being reflected in the hidden layer by the coupling of hidden states to different time points.

The inventive recurrent neural network represents a development of the network described in the German patent application DE 10 2007 001 025.9. The development consists of the hidden states of the hidden layer of the recurrent neural network at a respective time point comprising a first hidden state and a second hidden state, with the state of the technical system at the respective time point from the input layer being associated with the first hidden state and the action at the respective time point from the input layer being associated with the second hidden state. The first hidden state at the respective time point is also coupled to the second hidden state at the respective time point by way of a matrix, which is learned during modeling of the dynamic behavior of the technical system. The term matrix here is to be interpreted widely and can optionally also comprise a scalar (i.e. a 1×1 matrix). This allows the dynamic of the technical system to be learned more effectively by taking into account a corresponding matrix between hidden states at the same time point than is the case in the method in the German patent application DE 10 2007 001 025.9. In DE 10 2007 001 025.9 hidden states at the same time point are coupled to one another by way of an identity matrix.

In a second step of the inventive method an action selection rule is then learned. Learning here takes place in such a manner that the recurrent neural network, which was trained with the training data in the first step, is coupled to a further neural network for a current and future time point, the further neural network comprising at least one input layer, at least one hidden layer comprising hidden states and at least one output layer. The input layer of the further neural network at a respective time point here comprises at least some of the hidden states of the recurrent neural network at the respective time point and the output layer of the further neural network at a respective time point comprises the action carried out on the technical system at the respective time point and/or the change in the action carried out on the technical system compared with the temporally preceding action. Should an action therefore be an action in the actual sense, for which a change in the parameters of the technical system is associated with the carrying out of an action, the output layer comprises the action carried out on the technical system itself. However should the action be represented by a manipulated variable or parameter of the technical system itself, the output layer comprises the change in this action (i.e. the manipulated variable) compared with the temporally preceding action (i.e. the temporally preceding manipulated variable).

According to the invention the further neural network takes on the task of optimal control of the technical system in respect of future actions taking into account the modeled dynamic of the technical system carried out in the first step.

Finally in the inventive method with the recurrent neural network, which is coupled to the further neural network and with which the action selection rule was learned, states of the technical system and/or preferably optimal actions to be carried out on the technical system are defined. The technical system can then be regulated or controlled correspondingly based on the determined states or actions. It has been shown here that such a network architecture allows data-efficient learning of the dynamic behavior of a technical system. Data efficiency is of great importance here, as the available or relevant data material is extremely limited in most technical systems.

In one preferred embodiment of the inventive method the first hidden states of the hidden recurrent layer of the recurrent neural network respectively comprise a first number of variables and the second hidden states of the hidden recurrent layer comprise a second number of variables, the first number being different from the second number. In particular the first number is smaller than the second number or vice versa. It is possible in this manner to produce a bottleneck structure, with which the learning of the recurrent neural network is concentrated on the essential, autonomous structure of the dynamic. This allows better modeling of the technical system to be achieved, which in turn results in better learning of the action selection rule by the further neural network.

In the same way as the hidden states, states of the technical system and the actions also preferably comprise a number of variables. Similarly the hidden states of the further neural network also preferably consist of a number of hidden variables. In particular the number of hidden variables of a hidden state of the recurrent and/or further neural network is smaller here than the number of ambient variables of a state of the technical system. The number of hidden states here is preferably selected so that the method is both data-efficient and also still provides good results.

As mentioned above, actions can be represented by manipulated variables, so that an action an also consist of a variable not being changed. Alternatively or additionally it is however also possible for a number of discrete actions that can be carried out on the technical system to be predetermined, with the output layer of the further neural network at a respective time point at least partially comprising the discrete actions carried out on the technical system instead of the change in the action.

In one particularly preferred embodiment, in which the actions are represented at least partially by manipulated variables, the change in the action carried out at the respective time point compared with the temporally preceding action in the output layer of the further neural network is coupled to the action at the respective time point in the input layer of the recurrent neural network by way of a coupling matrix. This matrix can optionally also be a scalar (1×1 matrix). This coupling matrix can be used here to scale or restrict the possible values of the actions, allowing efficient tailoring of the learning of the action selection rule as a function of the technical system so that only possible or expedient actions in the technical system are allowed by way of the coupling matrix. The action at the respective time point in the input layer of the recurrent neural network is preferably coupled here to the temporally preceding action by way of a unit matrix.

In a further embodiment of the inventive method the input layer of the further neural network at a respective time point comprises the first hidden state of the recurrent neural network at the respective time point. In this embodiment the second hidden state is not coupled to the further neural network.

In one preferred embodiment the action selection rule is learned according to an evaluation function, which takes into account one or more criteria relating to the states of the technical system and/or the actions carried out on the technical system and/or which is learned in the step of modeling the dynamic behavior of the technical system.

In one particularly preferred embodiment a feed-forward network is used as the further neural network in the inventive method, with the neurons of the hidden layers not being coupled back temporally.

In a further variant of the invention the evaluation function is selected so that it parameterizes an optimal dynamic behavior of the technical system. This allows optimal control of the technical system to be achieved by corresponding selection of the evaluation function. In this process the evaluation function can be represented for example by a cost function to be optimized.

When the dynamic behavior of the technical system is being modeled by the recurrent neural network in the first step of the inventive method, in one particularly preferred embodiment the error between the states defined by the recurrent neural network and the states of the training data is minimized.

In one particularly preferred embodiment the inventive method is used in order to model a nonlinear dynamic behavior of a technical system and/or to learn a nonlinear action selection rule using the method.

In a further embodiment of the inventive method a backpropagation method is used to model the dynamic behavior of the technical system with the recurrent neural network in the first step of the method and/or to learn the action selection rule in the second step of the method. Such backpropagation methods are adequately known from the prior art and the method described in publication [1] is used here in particular.

The recurrent neural network, with which the dynamic behavior of the technical system is modeled, is preferably a network with dynamically consistent temporal deconvolution taking into account future states and actions, which is also referred to as a recurrent neural network with dynamically consistent overshooting. In such a network the network's own predictions in the output layer are used as a substitute for future inputs in the input layer.

In one particularly preferred embodiment of the inventive method the modeling of the technical system with the recurrent neural network is represented by the following equations:

$$\bar{s}_\tau = \tanh(\hat{A}\hat{s}_\tau + Da_\tau^d + \theta)$$

$$x_{\tau+1} = C\bar{s}_\tau$$

with $$\hat{s}_\tau = \begin{cases} A\bar{s}_{\tau-1} + Bx_\tau^d & \forall\, \tau \leq t \\ A\bar{s}_{\tau-1} + Bx_\tau & \forall\, \tau > t \end{cases}$$

$$\sum_t \sum_\tau (x_\tau - x_\tau^d)^2 \to \min_{A,\hat{A},B,C,D,\theta}$$

where the value range of τ comprises a predetermined number m of time steps before the time point t and a predetermined number n of time steps after the time point t;

where $t \in \{m, \ldots, T-n\}$, where T is the number of time points, for which training data is present;
where $x_\tau$ represents the state of the technical system at time point $\tau$ defined by the recurrent neural network;
where $x_\tau^d$ represents the state of the technical system at time point $\tau$ according to the training data;
where $a_\tau$ represents the action at time point $\tau$ defined by the recurrent neural network;
where $a_\tau^d$ represents the action carried out on the technical system at time point $\tau$ according to the training data;
where $\hat{S}_\tau$ represents the first hidden state and $\overline{S}_\tau$ the second hidden state at time point $\tau$ of the hidden layer of the recurrent neural network;
where I is the unit matrix and $\hat{A}$, A, B, C, D are the matrices to be defined and $\theta$ is a bias to be defined.

As a result, the equations produce the corresponding matrices A, $\hat{A}$, B, C, D and the corresponding bias $\theta$, which are selected such that the quadratic error between the predicted and actual states is minimized.

In the second step the matrices A, $\hat{A}$, B, C and D and the parameter $\theta$ are finally fixed and the reward rule is then preferably learned with the aid of the following equations:

$$\overline{s}_\tau = \begin{cases} \tanh(\hat{A}\hat{s}_\tau + Da_\tau^d + \theta) & \forall \tau > t \\ \tanh(\hat{A}\hat{s}_\tau + Da_\tau + \theta) & \forall \tau \geq t \end{cases}$$

$$R_{\tau+1} = Gh(C\overline{s}_\tau) \text{ for all } \tau \geq t$$

with $$\hat{s}_\tau = \begin{cases} A\overline{s}_{\tau-1} + Bx_\tau^d & \forall \tau \leq t \\ A\overline{s}_{\tau-1} + Bx_\tau & \forall \tau > t \end{cases}$$

and $$a_\tau = a_{\tau-1} + Hf(F\tanh(E\hat{s}_\tau + b))$$

for all $\tau \geq t$ $$\sum_t \sum_{\tau > t} c(R_\tau) \to \min_{E,F,b}$$

where G is a matrix and h any activation function, mapping the state $x_{\tau+1}$ of the technical system onto a state $R_{\tau+1}$ of relevance to the cost function $C(\bullet)$;
where f is any activation function;
where E and F are matrices to be defined and b is a bias to be defined;
where H is any matrix for adapting the change in the action at the respective time point compared with the temporally preceding action;

As mentioned above, the functions f and h can be any activation functions, in particular they can also represent identity mapping.

The inventive method can be used for any technical systems. One possible application is a turbine for example, in particular a gas turbine.

The technical system is controlled in such a manner that at the start of control all the steps of the inventive method apart from the actual action selection step are first carried out and then the resulting recurrent neural network with the learned action selection rule coupled to the further neural network is used to select the actions carried out to control the technical system. The control rules are thus fixed once and then no longer changed during control of the technical system.

Alternatively it is also possible, while the control of the technical system is being carried out, for all the steps of the inventive method (apart from the actual action selection) to be carried out at regular intervals, with the new states and actions resulting during the control being taken into account as new and/or further training data when said steps are carried out. After these steps of the inventive method have been carried out, the resulting recurrent neural network with the learned action selection rule coupled to the further neural network is then used to select further actions. This ensures online learning of the regulation during control of the technical system.

The invention has been described above based on the control and/or regulation of a technical system. The inventive modeling of the dynamic of a technical system based on a recurrent neural network with first and second hidden states, which are coupled by way of a matrix to be learned, can however also be used for the computer-aided simulation of a technical system. Here the dynamic of the technical system is modeled and its behavior simulated, in that, for an action carried out at a respective time point, the new state of the technical system at the next time point is defined based on the modeling carried out.

In addition to the method described above the invention also comprises a computer program product with a program code stored on a machine-readable medium for carrying out the inventive control method, when the program is running on a computer.

BRIEF DESCRIPTION OF THE DRAWINGS

Exemplary embodiments of the invention are described in detail below with reference to the accompanying figures, in which.

DETAILED DESCRIPTION OF THE INVENTION

The inventive method is described in detail below. The method can be applied here to any type of technical system, whose dynamic behavior can be described by a state space X and an action space A with a (stochastic) transition function $P(x_t, a_t, x_{t+1})$. Here $x_t, x_{t+1} \in X$ are states of the technical system at the time points t and t+1, with each state being characterized by a number of state and/or ambient variables. These ambient variables here are measurable state variables of the technical system, for example gas pressure, gas temperature, combustion chamber acceleration and the like in a gas turbine. The actions $a_t \in A$ here are changes in manipulated variables of the technical system at the time point t, which in turn influence subsequent states of the technical system. As with the state $x_t$, the action $a_t$ can also comprise a number of action variables and an action can thus be characterized by the change in a number of manipulated variables. One example of a manipulated variable that can be changed on a technical system is the valve setting in a gas turbine. The technical systems are often also designed such that the state space and action space overlap, in other words a manipulated variable in the technical system also characterizes the state of the technical system.

The above description of the technical system with the aid of a state space X, an action space A and a stochastic transition function P corresponds to the Markov Decision Process MDP known from the prior art. It is thus assumed that the technical system can be described using such a process. This process has a reward or cost function c: X×A→R, R representing the reward space, which keeps the system in state $x_t$ for the selection of an action $a_t$. The objective now is to define an optimum rule Π:X→A, which maximizes the expected cumulative or average reward function c for each state $x_t$. Maximizing the reward function c here corresponds to one possible embodiment of an action selection rule, as defined in the claims. The reward function is set in particular in such a manner that it reflects the desired characteristics of the technical system with the optimum being achieved when the function is a maximum. In the simplest instance the cost function could for example be an advantageous desired state of the technical system, which is optimal when it has a maximum value. It is assumed below that the technical system is a deterministic Markov decision process with discrete time steps, the state spaces X and A being continuous.

Figure 1:
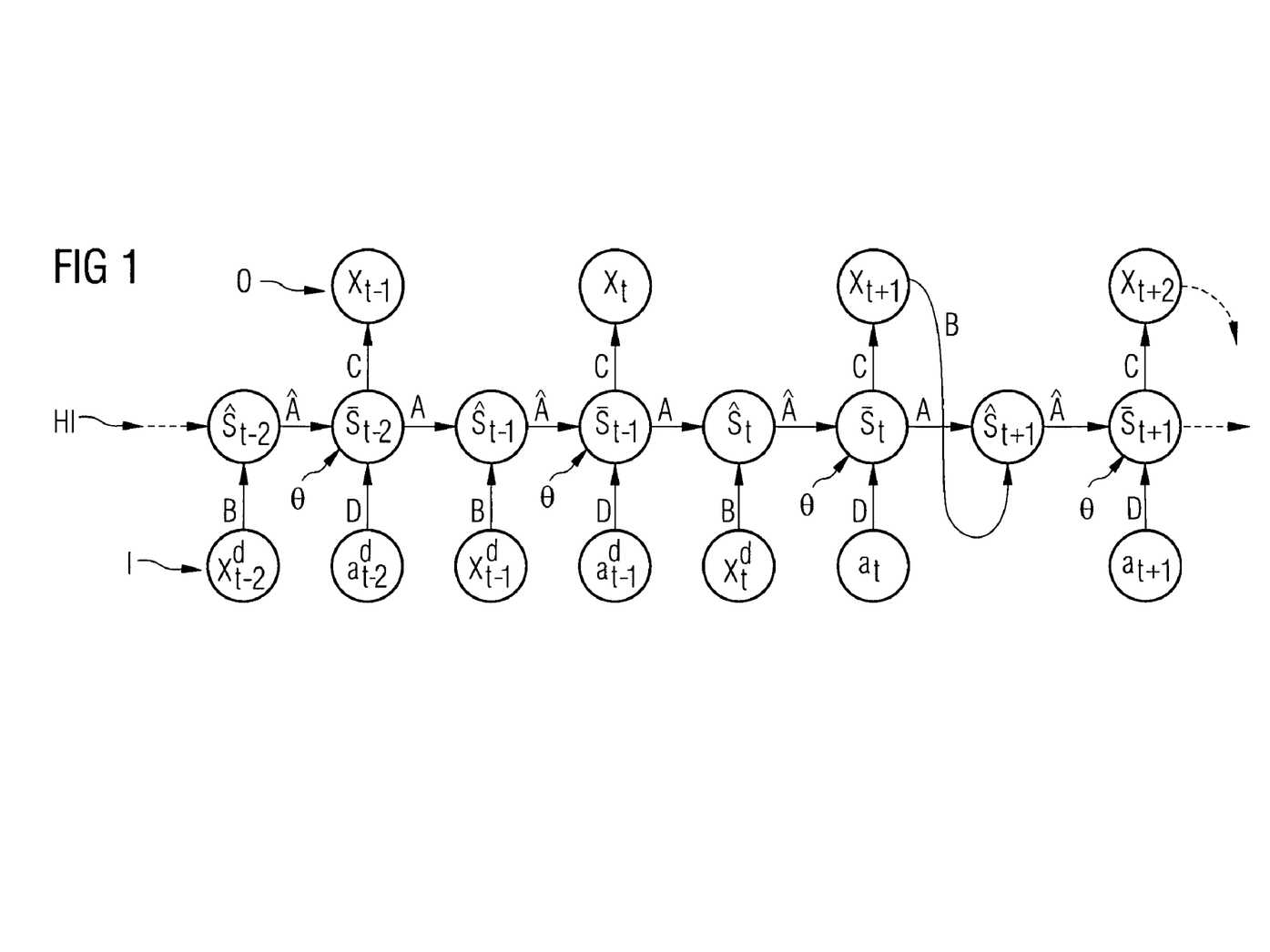
FIG. 1 shows a schematic diagram illustrating the modeling of a technical system with a recurrent neural network according to an embodiment of the invention.

According to the invention a Markov decision process is modeled with a recurrent neural network RNN, with the result that a mapping of the dynamic behavior of the technical system, i.e. of the transmission function P(•), is mapped by a high-dimensional nonlinear system equation. The recurrent neural network RNN used in the variant of the invention described here is shown in FIG. 1. The recurrent neural network comprises an input layer I, which shows the states and actions at the individual time points. FIG. 1 shows the states $x_{t-2}^d$, $x_{t-1}^d$ and $x_t^d$ and the actions $a_{t-2}^d$, $a_{t-1}^d$, $a_t$ and $a_{t+1}$ by way of example. The states $x_{t-1}^d$ and $x_t^d$ and the actions $a_{t-2}^d$ and $a_{t-1}^d$ here are known states and actions from a training data record for the recurrent neural network. In the embodiment described here the individual actions are represented as manipulated variables, in other words an action represents the setting of a manipulated variable. In this sense an action can also consist of no change being made to the manipulated variable, if the value of the manipulated variable does not change from the preceding time step to the next time step. In this sense actions can also comprise what are known as "zero actions", which consist of no change being made to a manipulated variable. A manipulated variable in the sense of the invention is any parameter, the dimension or value of which can be directly influenced on the technical system. The changing of manipulated variables has an influence on the state of the technical system, with a state differing from a manipulated variable in that a state cannot necessarily be directly influenced. Manipulated variables can in this sense also be seen as a subset of states of the technical system, it being possible for their value to be influenced directly by an action.

The input layer I of the network in FIG. 1 is coupled to a hidden layer HI by way of corresponding matrices B and D, which are defined further below. The hidden, recurrent layer HI has hidden states for each time point, with the states $\hat{s}_{t-2}$, $\bar{s}_{t-2}, \hat{s}_{t-1}, \bar{s}_{t-1}, \hat{s}_t, \bar{s}_t, \hat{s}_{t+1}$ and $\bar{s}_{t+1}$ being shown by way of example in FIG. 1. The states with a roof above the letter s correspond here to the first hidden states in the sense of claim 1 and the states with the bars over the letter s correspond to the second hidden states in the sense of claim 1. The first and second state are hereby coupled to one another at a respective time point by way of the matrix Â, this matrix also being learned when the dynamic of the technical system is learned. In the embodiment of the network in FIG. 1 the dimension of the first hidden states differs from the dimension of the second hidden states; the dimension of the respective first hidden state is preferably smaller than the dimension of a second hidden state but the reverse is also possible. Using the additional matrix Â to be learned produces a bottleneck structure, which is not present in the recurrent neural network according to the German patent application DE 10 2007 001 025.9. The unit matrix was used there instead of the matrix Â. The bottleneck structure forces the network to concentrate on the essential, autonomous structure of the dynamic. As well as resulting in a better approximation of the dynamic this in particular means that the actions are taken into greater account. The bottleneck structure on the one hand increases the instant influence of actions on the system dynamic. It also improves action selection, as this is based on better approximation of the dynamic.

In the hidden layer HI the second hidden state at a time point is also coupled to the first hidden state at the next time point by way of the matrix A. A bias θ is also taken into account for each second hidden state. The recurrent neural network in FIG. 1 also has an output layer O, which is formed by the states of the technical system, with the states $x_{t-1}$, $x_t$, $x_{t+1}$ and $x_{t+2}$ being shown in FIG. 1. These states are coupled respectively to the hidden states $\bar{s}_{t-2}, \bar{s}_{t-1}, \bar{s}_t$ and $\bar{s}_{t+1}$ by a matrix C.

The neural network according to FIG. 1 is a network with dynamically consistent temporal deconvolution taking into account future states, in other words a neural network with dynamically consistent overshooting. This means that during modeling of the neural network not only time points τ in the past but also time points τ in the future are taken into account and the network's own predicted states in the output layer are used as inputs for future states in the input layer. The parameter τ is restricted by the length of the prior deconvolution m and the length of the so-called overshooting n, so the following applies: $\tau \in \{t-m, \ldots, t+n\}$ for all considered time points $t \in \{m, \ldots, T-n\}$, where T represents the number of available time points, for which training data is available for the learning of the neural network. Overshooting results in FIG. 1 because future time points τ>t are also taken into account during modeling of the technical system by the neural network. As these future time points are not known, the states output by way of the network in the output layer are again used as input for the next time step. This is shown in FIG. 1 for the time point t+1, at which the output state $x_{t+1}$ is again allocated to the hidden state $\hat{s}_{t+1}$ of the hidden layer HI.

Therefore in the embodiment of the invention described here a sequence of states $x_τ$ and actions $a_τ$ is created on the input side of the recurrent neural network, with the network being temporally deconvoluted in a predetermined interval, which takes into account the past and future. The recurrent neural network in FIG. 1 can be described mathematically by the following equations, with the above-mentioned matrices Â, A, B, C, D and the bias θ being contained in the equations:

$$\bar{s}_\tau = \tanh(\hat{A}\hat{s}_\tau + Da_\tau^d + \theta)$$

$$x_{\tau+1} = C\bar{s}_\tau$$

with $$\hat{s}_\tau = \begin{cases} A\bar{s}_{\tau-1} + Bx_\tau^d & \forall \tau \leq t \\ A\bar{s}_{\tau-1} + Bx_\tau & \forall \tau > t \end{cases}$$

The first hidden state $\hat{S}_\tau$ here is a pre-state, which aggregates the information from a preceding second hidden state $\bar{S}_{\tau-1}$ and from the external state $x_\tau^d$. The nonlinearity in the hidden layer is expressed here using the tangens hyperbolicus. In the embodiment described here the pre-state $\hat{S}_\tau$ has a smaller dimension than the second hidden state $\bar{S}_\tau$ and is associated with this by way of the matrix Â, which is learned during training of the neural network. This allows an advantageous bottleneck structure to be created.

The second hidden state $\overline{s}_\tau$ has as input an action $a_\tau^d$ and/or $a_\tau$ and is used to calculate the expected next state $x_{\tau+1}$ of the technical system. The matrix D is an additional matrix of appropriate dimension, which takes into account the influence of the actions $a_\tau^d$ and/or $a_\tau$ on the state $\overline{s}_\tau$. The actions $a_\tau$ are supplied to the neural network RNN as future inputs ($\tau > t$), as they do not influence the dynamic of the technical system directly and therefore should not be learned by the network. To cover a plurality of possible states in the state space X of the technical system, the recurrent neural network for modeling the technical system should be modeled with training data, in which the actions $a_\tau^d$ are selected randomly. Otherwise the learned dynamic can be a function of a specific rule in some instances.

The objective of the inventive method is now to combine a neural network from FIG. 1 learned with training data with reinforcement learning for learning the above-mentioned optimal rule Π. According to the invention this is achieved by combining the recurrent neural network in FIG. 1 with a further so-called control network, with the result that the above reward function c is implemented in the neural network.

In the embodiment described here the additional control network is a three-layer neural feed-forward network with an input layer, a hidden layer and an output layer. Even if further, more complex topologies were possible, it is possible to model any type of control function with the model described here. As the optimal action at is to be predicted, the control network is only coupled to the recurrent neural network for future time points (i.e. $\tau > t$). For past temporal deconvolution (i.e. $\tau < t$) the previously allocated actions are used in the recurrent neural network.

Figure 2:
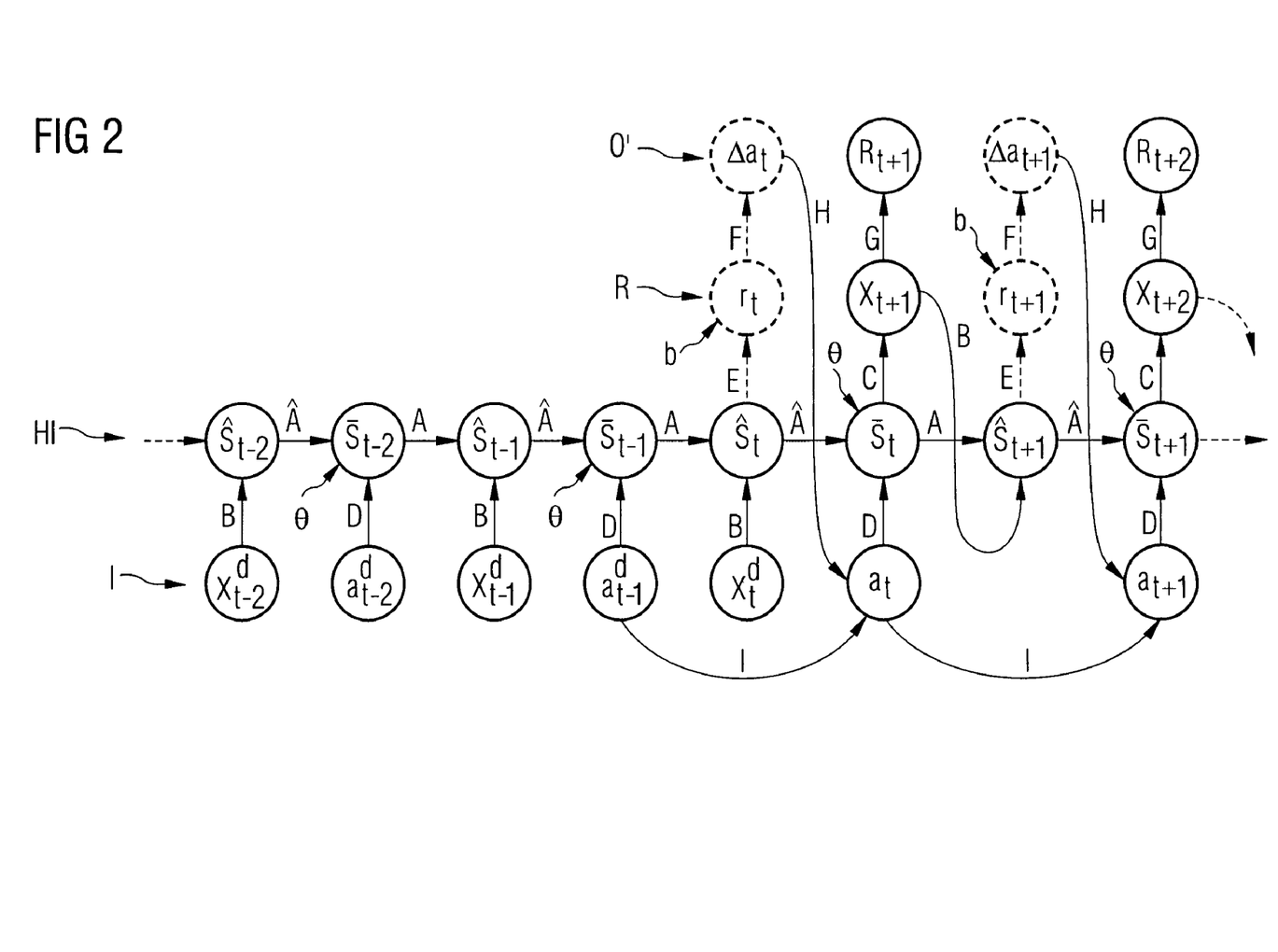
FIG. 2 shows a schematic diagram of the learning of an action selection rule by the recurrent neural network in FIG. 1 in combination with a feed-forward network according to an embodiment of the invention.

FIG. 2 shows the recurrent neural network coupled to the further feed-forward network, which is hereafter also referred to as RCNN (RCNN=Recurrent Control Neural Network). The parts of the network relating to the feed-forward control network are shown with a broken line here. The control network uses as its input layer the first hidden states $\hat{s}_t, \hat{s}_{t+1}, \ldots$, etc., which are coupled to a hidden layer R with corresponding states $r_t, r_{t+1}$, etc. The hidden states $r_\tau$ here are coupled to the states $\hat{s}_\tau$ by way of a matrix E and a bias b, in other words the following applies:

$$r_\tau = \tan h(E\hat{s}_\tau + b)$$

The hidden states $r_\tau$ are also coupled by way of matrix F to the future action changes $\Delta a_\tau$ to be modeled, the action changes in the embodiment described here corresponding to manipulated variable changes. The action change $\Delta a_t$ and/or $\Delta a_{t+1}$ is coupled here by way of a matrix H to the action $a_t$ and/or $a_{t+1}$ to be predicted, it being possible for the matrix H to bring about a corresponding restriction and/or scaling of the action change. This in particular ensures in a simple manner that only action changes that are also actually possible on the system in question are enabled. Action changes, which cannot occur or are not expedient during actual operation of the technical system (because they result for in example in destruction of or damage to the system) are thus prevented with the matrix H. As a new action $a_\tau$ ($\tau \geq t$) is made up of the preceding action $a_{\tau-1}^d$ and/or $a_{\tau-1}$ and the corresponding action change $\Delta a_t$, according to FIG. 2 the earlier actions $a_{\tau-1}^d$ and/or $a_{\tau-1}$ are also included in the actions $a_\tau$ by way of the identity matrix I. A matrix G also exists, which couples future states $x_{t+1}, x_{t+2}$ etc. to states $R_{t+1}, R_{t+2}$, etc., with the latter being states of relevance for the calculation rule.

The neural network RCNN used according to the invention must carry out two different tasks. On the one hand it must identify the dynamic of the underlying technical system and on the other hand it must achieve optimal control of the technical system with the aid of a corresponding action selection and/or reward rule. The network is thus trained in two successive steps, namely one step for the learning of the recurrent neural network using training data and one step for the learning of a reward rule by coupling the recurrent neural network to a feed-forward network. This inventive approach differs from conventional methods, in which combined learning of both tasks is attempted in one step.

In the first step of the inventive method the dynamic of the underlying Markov decision process is modeled first, this corresponding to the dynamic behavior of a technical system. The network RCNN is therefore reduced to a recurrent neural network RNN with dynamically consistent temporal deconvolution taking into account future states. This first step is represented mathematically by the following equations:

$$\overline{s}_\tau = \tanh(A\hat{s}_\tau + Da_\tau^d + \theta) \tag{1}$$

$$x_{\tau+1} = C\overline{s}_\tau \tag{2}$$

with $$\hat{s}_\tau = \begin{cases} A\overline{s}_{\tau-1} + Bx_\tau^d & \forall \tau \leq t \\ A\overline{s}_{\tau-1} + Bx_\tau & \forall \tau > t \end{cases} \tag{3}$$

$$\sum_t \sum_\tau (x_\tau - x_\tau^d)^2 \to \min_{A,\hat{A},B,C,D,\theta} \tag{4}$$

The last equation here represents the task of training, the aim of which is for a state $x_\tau$, which is defined by the recurrent neural network RNN, to correspond as closely as possible to the state $x_\tau^d$ of the training data. Minimization of the quadratic error is undertaken here in relation to the matrices A, Â, B, C and D and the bias θ, which represent the parameters of the recurrent neural network to be defined.

After the first step of modeling the dynamic of the technical system, the matrices A, B, C and D and the bias θ defined in this step are fixed, in other words their weightings are not changed during the further training. The matrices E and F and the bias b are now activated, as shown in FIG. 2. These are the only parameters during the second step of learning the reward rule. In this learning step the recurrent neural network does not receive any future actions as external inputs; instead these actions are learned with the feed-forward network taking the reward rule into account. The output clusters $x_\tau$ are also omitted for past time steps $\tau < t$, as they are only required for modeling the dynamic in the first step. For future time steps $\tau > t$ of the network the error function according to equation (4) is replaced by the reward and/or cost function c(•), which is cited below in equation (9). This is achieved in the architecture by the additional reward clusters $R_\tau$, which are associated with the output clusters by a problem-specific fixed matrix G, which is a function of the above-mentioned reward function c(•), and a possible activation function h within the output clusters $x_\tau$. The network RCNN thus codes the reward function c(•) within the neural architecture. This means that the reward cluster $R_\tau$ not only has to be calculated on the basis of the output cluster $x_\tau$ but it can also be described more generally, thereby allowing even more complicated network architectures. For example the reward function can be learned explicitly, which is helpful in particular when c(•) is not known or not specified in full. This can be achieved by means of a further additional three-layer neural network with the RCNN output as input.

The weightings of the feed-forward network are only adapted according to the backpropagated reward of the reward clusters $R_\tau$ ($\tau$>t). This corresponds to the notion that the second step of learning the action selection rule serves not to identify the dynamic but simply to learn a rule that maximizes the reward, with the dynamic of the system having already been modeled beforehand.

The second step of learning the reward rule can be shown mathematically by the following equations (5) to (9). The matrices E and F and the bias b are learned here. The equations (5) to (9) are as follows:

$$\bar{s}_\tau = \begin{cases} \tanh(\hat{A}\hat{s}_\tau + Da_\tau^d + \theta) & \forall \tau < t \\ \tanh(\hat{A}\hat{s}_\tau + Da_\tau + \theta) & \forall \tau \geq t \end{cases} \quad (5)$$

$$R_{\tau+1} = Gh(C\bar{s}_\tau) \quad (6)$$
for all $\tau \geq t$ $$\text{with } \hat{s}_\tau = \begin{cases} A\bar{s}_{\tau-1} + Bx_\tau^d & \forall \tau \leq t \\ A\bar{s}_{\tau-1} + Bx_\tau & \forall \tau > t \end{cases} \quad (7)$$

and $a_\tau = a_{\tau-1} + Hf(F\tanh(E\bar{s}_\tau + b))$ for all $\tau \geq t$ (8)

$$\sum_t \sum_{\tau > t} c(R_\tau) \to \min_{E,F,b} \quad (9)$$

The recurrent neural network is trained with the same training patterns T and with a backpropagation method according to publication [1], which is known sufficiently from the prior art, both during the modeling of the dynamic of the technical system according to equations (1) to (4) and also during the learning of the reward rule according to equations (5) to (9). Each training pattern T here corresponds to a time point, to which corresponding training data is assigned in the form of the state of the technical system and the action carried out at this time point. The step of learning the reward rule can be seen here as backpropagation of the error of the reward function c(•).

The embodiment of the recurrent neural control network RCNN described above ideally combines the advantages of a recurrent neural network RNN with dynamically consistent temporal deconvolution taking into account future states for identifying the dynamic with a three-layer neural control network for learning the reward rule. This allows a high level of approximation precision to be achieved and complex dynamic systems can be controlled in a very data-efficient manner. The system can also be scaled to higher dimensions very simply and an only partially observable environment can be reconstructed from states of the technical system. The network can also be used to process continuous state spaces and action spaces very effectively.

The embodiment of the invention described with reference to FIG. 1 and FIG. 2 has the advantage, compared with the embodiment described in the patent application DE 10 2007 001 025.9, that the inclusion of a weighting matrix $\hat{A}$ to be learned allows a bottleneck to be produced between hidden states, forcing the network to concentrate on the essential, autonomous structure of the dynamic. Also taking into account actions in the form of manipulated variables and/or control parameters, which can optionally also comprise so-called "zero actions" (i.e. no change in the manipulated variable) makes it possible to adapt or correspondingly restrict the values of the changes in the manipulated variables to the characteristics of the technical system using the special matrix H. The restriction of manipulated variables is of particular importance for the simulation of gas turbines in particular, as the manipulated variables in each time step can only be changed within a restricted interval.

BIBLIOGRAPHY

[1] D. E. Rumelhart, G. E. Hinton, and R. J. Williams, "Learning internal representations by error propagation", in *Parallel Distributed Processing: Explorations in The Microstructure of Cognition*, D. E. Rumelhart and J. L. M. et al., Eds. Cambridge: MIT Press, 1986, vol. 1, pp. 318-362
[2] Leslie Pack Kaelbling; Michael L. Littman; Andrew W. Moore, Reinforcement Learning: A Survey, Journal of Artificial Intelligence Research 4 (1996) pp. 237-2

The invention claimed is:

1. A method for computer-aided control of a technical system, comprising:
    characterizing a dynamic behavior of the technical system by a number of states and actions at a number of time points, a respective action at a respective time point resulting in a new state at a next time point;
    modeling the dynamic behavior with a recurrent neural network by a training data comprising known states and known actions at the number of time points,
    wherein the recurrent neural network comprises:
        an input layer comprising the states and the actions at the number of time points,
        a hidden recurrent layer comprising a number of hidden states at the number of time points, and
        an output layer comprising the states at the number of time points,
    wherein a respective hidden state at the respective time point comprises a first hidden state and a second hidden state at the respective time point,
    wherein a respective state in the input layer at the respective time point is associated with the first hidden state and the respective action in the input layer at the respective time point is associated with the second hidden state, and
    wherein the first hidden state is coupled to the second hidden by a matrix which is learned during the modeling;
    learning an action selection rule by coupling the recurrent neural network to a further neural network,
    wherein the further neural network comprises:
        a further input layer comprising the hidden states of the recurrent neural network,
        a further hidden layer comprising further hidden states, and
        a further output layer comprising the actions and changes of the actions compared with temporally preceding actions; and
    defining the states and the actions by coupling the recurrent neural network to the further neural network with the learned action selection rule.

2. The method as claimed in claim 1,
    wherein the first hidden state in the hidden recurrent layer comprises a first number of variables,
    wherein the second hidden state in the hidden recurrent layer comprises a second number of variables being different from the first number of variable, and
    wherein the first number of variables are smaller than the second number of variables or vice versa.

3. The method as claimed in claim 1, wherein:
    the state comprises one or more ambient variables,
    the action comprises one or more action variables,
    the hidden state comprises one or more hidden variables, the further hidden state comprises one or more further hidden variables, and a number of the hidden variables or a number of the further hidden variables is smaller than a number of the ambient variables.

4. The method as claimed in claim 1, wherein:

the actions comprise changeable manipulated variables of the technical system, the changes in the further output layer are changes in the manipulated variables, the changes are coupled to the actions by coupling matrixes, the actions are coupled to the temporally preceding actions by unit matrixes, and the coupling matrixes restrict or scale the changes.

5. The method as claimed in claim 1, wherein a number of discrete actions are predetermined and the further output layer at least partially comprises the discrete actions.

6. The method as claimed in claim 1, wherein the further input layer comprises the first hidden state at the respective time point.

7. The method as claimed in claim 1, wherein:

the selection rule is learned according to an evaluation function with a criteria relating to the states or the actions or the modeling, the evaluation function parameterizes an optimal dynamic behavior of the technical system, and the evaluation function comprises a cost function to be optimized.

8. The method as claimed in claim 1, wherein the modeling of the dynamic behavior minimizes an error between the states in the recurrent neural network and the known states in the training data.

9. The method as claimed in claim 1, wherein a nonlinear dynamic behavior of the technical system is modeled or a nonlinear action selection rule is learned.

10. The method as claimed in claim 1, wherein the model of the dynamic behavior or the learning of the action selection rule is performed by a backpropagation method.

11. The method as claimed in claim 1, wherein the recurrent neural network is a network with dynamically consistent temporal deconvolution with future states and actions.

12. The method as claimed in claim 1, wherein the modeling of the dynamic behavior is represented by following equations:

$$\bar{s}_\tau = \tanh(\hat{A}\hat{s}_\tau + Da_\tau^d + \theta)$$

$$x_{\tau+1} = C\bar{s}_\tau$$

$$\text{with } \hat{s}_\tau = \begin{cases} A\bar{s}_{\tau-1} + Bx_\tau^d & \forall \tau \le t \\ A\bar{s}_{\tau-1} + Bx_\tau & \forall \tau > t \end{cases}$$

$$\sum_t \sum_\tau (x_\tau - x_\tau^d)^2 \to \min_{A,\hat{A},B,C,D,\theta}$$

where a value range of $\tau$ comprises a predetermined number m of time steps before a time point t and a predetermined number n of time steps after the time point t;

where $t \in \{m, \ldots, T-n\}$, where T is a number of time points for which the training data is present;

where $x_\tau$ represents a state at the time point $\tau$ in the recurrent neural network;

where $x_\tau^d$ represents a known state at the time point $\tau$ in the training data;

where $a_\tau$ represents an action at the time point $\tau$ in the recurrent neural network;

where $a_\tau^d$ represents a known action at the time point $\tau$ in the training data;

where $\hat{s}_\tau$ represents the first hidden state and $\bar{s}_\tau$ represents the second hidden state at the time point $\tau$ in the hidden layer; and where I is an unit matrix and $\hat{A}$, A, B, C, D are matrices to be defined and $\theta$ is a bias to be defined.

13. The method as claimed in claim 1, wherein the learning of the action selection rule is represented by following equations:

$$\bar{s}_\tau = \begin{cases} \tanh(\hat{A}\hat{s}_\tau + Da_\tau^d + \theta) & \forall \tau < t \\ \tanh(\hat{A}\hat{s}_\tau + Da_\tau + \theta) & \forall \tau \ge t \end{cases}$$

$$R_{\tau+1} = Gh(C\bar{s}_\tau) \text{ for all } \tau \ge t$$

with $$\hat{s}_\tau = \begin{cases} A\bar{s}_{\tau-1} + Bx_\tau^d & \forall \tau \le t \\ A\bar{s}_{\tau-1} + Bx_\tau & \forall \tau > t \end{cases}$$

and $$a_\tau = a_{\tau-1} + Hf(F\tanh(E\hat{s}_\tau + b))$$

for all $\tau \ge t$ $$\sum_t \sum_{\tau > t} c(R_\tau) \to \min_{E,F,b}$$

where G is a matrix and h is an activation function mapping a state $x_{\tau+1}$ onto a further hidden state $R_{\tau+1}$ of relevance to a cost function $c(\bullet)$;

where f is an other activation function;

where E and F are matrices to be defined and b is a bias to be defined;

where H is a matrix for adapting the changes in the actions.

14. The method as claimed in claim 1, wherein:

the technical system comprises a turbine, and the turbine is a gas turbine.

15. The method as claimed in claim 1, wherein:

a resulting recurrent neural network is generated by coupling the learned action selection rule to the further neural network, and the actions are defined by the resulting recurrent neural network.

16. The method as claimed in claim 1, wherein:

the technical system is computer-aidedly controlled at regular intervals, a new training data is generated by new states and actions resulting during the control, and a resulting recurrent neural network is generated by coupling the learned action selection rule to the further neural network, and further actions are selected by the resulting recurrent neural network.

17. A method for computer-aided simulation of a technical system, comprising:

characterizing a dynamic behavior of the technical system by a number of states and actions at a number of time points, a respective action at a respective time point resulting in a new state at a next time point;

modeling the dynamic behavior with a recurrent neural network by a training data comprising known states and known actions at the number of time points, wherein the recurrent neural network comprises:

an input layer comprising the states and the actions at the number of time points, a hidden recurrent layer comprising a number of hidden states at the number of time points, and an output layer comprising the states at the number of time points, wherein a respective hidden state at the respective time point comprises a first hidden state and a second hidden state at the respective time point, wherein a respective state in the input layer at the respective time point is associated with the first hidden state and the respective action in the input layer at the respective time point is associated with the second hidden state, and wherein the first hidden state is coupled to the second hidden by a matrix which is learned during the modeling; and simulating the dynamic behavior by defining the new state at the next time based on the modeling.

18. A computer program product executable on a computer for computer-aided control of a technical system, comprising:

a computer program code that performs steps of:

characterizing a dynamic behavior of the technical system by a number of states and actions at a number of time points, a respective action at a respective time point resulting in a new state at a next time point;

modeling the dynamic behavior with a recurrent neural network by a training data comprising known states and known actions at the number of time points, wherein the recurrent neural network comprises:

an input layer comprising the states and the actions at the number of time points, a hidden recurrent layer comprising a number of hidden states at the number of time points, and an output layer comprising the states at the number of time points, wherein a respective hidden state at the respective time point comprises a first hidden state and a second hidden state at the respective time point, wherein a respective state in the input layer at the respective time point is associated with the first hidden state and the respective action in the input layer at the respective time point is associated with the second hidden state, and wherein the first hidden state is coupled to the second hidden by a matrix which is learned during the modeling;

learning an action selection rule by coupling the recurrent neural network to a further neural network, wherein the further neural network comprises:

a further input layer comprising the hidden states of the recurrent neural network, a further hidden layer comprising further hidden states, and a further output layer comprising the actions and changes of the actions compared with temporally preceding actions; and defining the states and the actions by coupling the recurrent neural network to the further neural network with the learned action selection rule.

* * * * *